United States Patent
Dalluge et al.

(10) Patent No.: US 7,059,585 B2
(45) Date of Patent: Jun. 13, 2006

(54) FLUID VALVE CONTROL MEMBERS HAVING CONTOURED SEALING SURFACES

(75) Inventors: Paul Russell Dalluge, Marshalltown, IA (US); Larry Dean Pothast, Marshalltown, IA (US); Gary Alan Witt, Sherman, TX (US)

(73) Assignee: Fisher Controls International, St. Louis, MO (US)

( * ) Notice: Subject to any disclaimer, the term of this patent is extended or adjusted under 35 U.S.C. 154(b) by 0 days.

(21) Appl. No.: 10/879,912

(22) Filed: Jun. 29, 2004

(65) Prior Publication Data

US 2005/0285068 A1 Dec. 29, 2005

(51) Int. Cl.
  *F16K 5/00* (2006.01)
(52) U.S. Cl. .................................... 251/315.16
(58) Field of Classification Search ............ 251/315.16
  See application file for complete search history.

(56) References Cited

U.S. PATENT DOCUMENTS

| 3,125,292 A | * | 3/1964 | Larson ........................ 236/1 C |
| 3,456,916 A | * | 7/1969 | Hutchens et al. ........... 251/309 |
| 3,674,238 A | | 7/1972 | Pickles et al. |
| 4,121,607 A | | 10/1978 | Bader |
| 4,542,878 A | * | 9/1985 | Kulisek ................. 251/315.16 |
| 5,170,992 A | | 12/1992 | Lenberg |
| 5,618,026 A | | 4/1997 | Geyer |

OTHER PUBLICATIONS

International Bureau, *International Search Report*, Sep. 14, 2005, 5 pages.
International Bureau, Written Opinion, Sep. 14, 2005, 6 pages.

* cited by examiner

*Primary Examiner*—J. Casimer Jacyna
(74) *Attorney, Agent, or Firm*—Hanley, Flight & Zimmerman LLC

(57) ABSTRACT

Fluid valve control members having contoured sealing surfaces and methods of making the same are disclosed. An example fluid valve control member includes a body portion having a sealing surface configured to engage a sealing ring within a fluid control valve. A first portion of the sealing surface has a first spherical radius with respect to a first point along a centerline of the body portion and a second portion of the sealing surface has a second spherical radius with respect to a second point along the centerline of the body portion. The first and second points are offset from each other and the second spherical radius is sized to be smaller than the first spherical radius to form a substantially seamless transition between the first and second portions of the sealing surface.

18 Claims, 3 Drawing Sheets

FLUID VALVE CONTROL MEMBERS HAVING CONTOURED SEALING SURFACES

FIELD OF THE DISCLOSURE

The present disclosure relates generally to fluid valves and, more specifically, to fluid valve control members having contoured sealing surfaces.

BACKGROUND

Process control plants or systems often employ rotary valves, such as ball valves, butterfly valves, etc., to control the flow of process fluids. In general, rotary valves typically include a fluid flow control element or member that is disposed in the fluid path and rotably coupled to the body of the valve via one or more shafts. Typically, a portion of a shaft extends from the valve to function as a valve stem, which may be operatively coupled to an actuator (e.g., a pneumatic actuator, an electric actuator, a hydraulic actuator, etc.)

In operation, a controller may cause the actuator to rotate the valve stem and, thus, the control member to a desired angular position to vary an amount of fluid flowing through the valve. When the valve is closed, the control member is typically configured to engage an annular or circumferential seal that encircles the flow path through the valve to prevent the flow of fluid (e.g., in one or both directions) through the valve.

The control element or member within a ball-type fluid valve, which is commonly referred to as a ball valve, typically has a generally spherically shaped or otherwise curved sealing surface that is configured to engage a circumferential sealing ring. Some ball valves utilize a flow control member having a spherically shaped sealing surface with a substantially constant or single spherical radius of curvature. Although ball valve control members having a single radius of curvature are relatively easy to manufacture using automated processes (e.g., using a computer numerical control (CNC) machine), such single radius control members have some operational drawbacks. For instance, ball valve control members having a sealing surface with a single radius of curvature require a mating sealing ring to fully deflect upon contact with the leading edge of the control member and through a relatively large angle of engagement, which can prematurely wear or otherwise damage the sealing ring.

Other ball valve designs, such as that disclosed in U.S. Pat. No. 3,456,916, employ a contoured control member surface having a variable radius of curvature. The variable radius of curvature serves to gradually deflect the sealing ring when the control member engages the sealing ring during, for example, closing of the valve, thereby increasing the cycle life of the sealing ring. However, the manufacture of such a variable radius ball valve control member typically requires costly, error prone manual grinding operations to smooth or blend the substantially different spherical radii that are normally used. For example, such grinding operations may be needed to eliminate a ridge or the like formed at the intersection of the different curvature radii. Unfortunately, during such manual grinding operations it is difficult to avoid compromising (e.g., by over grinding) the primary spherical radius of the sealing surface (i.e., the portion of the sealing surface that engages with the sealing ring to prevent the flow of fluid through the valve). Thus, it would be desirable to provide a ball valve control member having a contoured sealing surface that does not require additional manual blending or smoothing operations to eliminate ridges and/or other non-seamless types of transitions between sealing surface regions having different curvatures.

SUMMARY

In one example embodiment, a fluid valve control member includes a body portion having a sealing surface configured to engage a sealing ring within a fluid control valve. A first portion of the sealing surface has a first spherical radius with respect to a first point along a centerline of the body portion and a second portion of the sealing surface has a second spherical radius with respect to a second point along the centerline of the body portion. The first and second points are offset from each other and the second spherical radius is sized to be smaller than the first spherical radius to form a substantially seamless transition between the first and second portions of the sealing surface.

In another example embodiment, a method of making a fluid valve control member includes machining a body of the fluid valve control member to form a first sealing surface portion having a first spherical radius with respect to a centerline of the body. The example method also includes machining the body of the fluid valve control member to form a second sealing surface portion having a second spherical radius with respect to a second point along the centerline of the body offset from the first point. The first and second points are offset from each other and the second spherical radius is sized to be smaller than the first spherical radius to provide a substantially seamless transition between the first and second sealing surface portions.

DETAILED DESCRIPTION

The example fluid valve control member described herein provides a contoured sealing surface that is configured to gradually deflect a sealing ring during operation (e.g., during closing or shut off) of a ball-type fluid control valve. More specifically, in contrast to known fluid valve control mem bers having contoured sealing surfaces, the example fluid valve control member described herein has a sealing surface with first and second portions having different spherical radii. The first portion of the sealing surface has a first spherical radius with respect to a centerline of a body of the valve control member and the second portion of the sealing surface has a second spherical radius with the respect to the centerline of the body of the valve control member. The first and second spherical radii are offset from each other along the centerline of the body of the valve control member and the second spherical radius is smaller than the first spherical radius to provide a substantially smooth or seamless transition between the first and second portions of the sealing surface. The magnitude of the offset of the spherical radii along the centerline and the magnitude of the difference between the first and second spherical radii may be proportioned so that, for example, the offset is about twice the radial difference.

Figure 1:
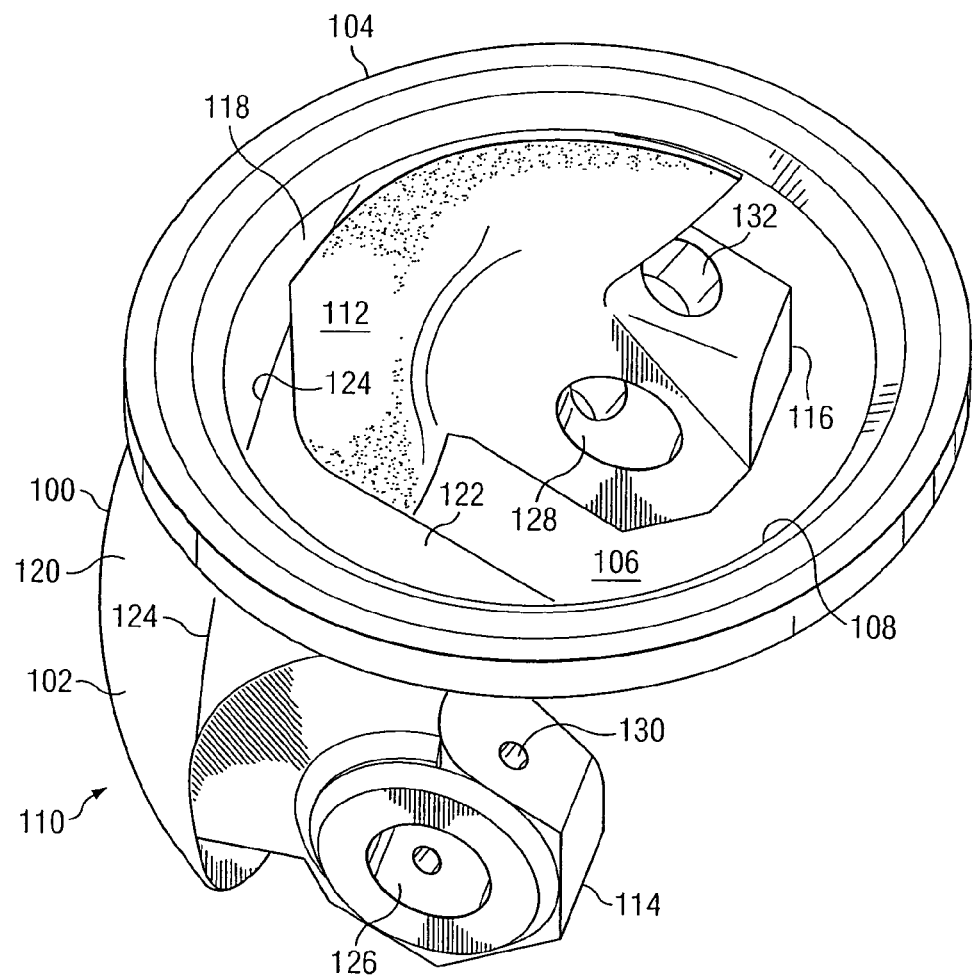
FIG. 1 is an isometric view of an example fluid valve control member that has a contoured sealing surface and which may be used within a ball-type fluid control valve.
Figure 2:
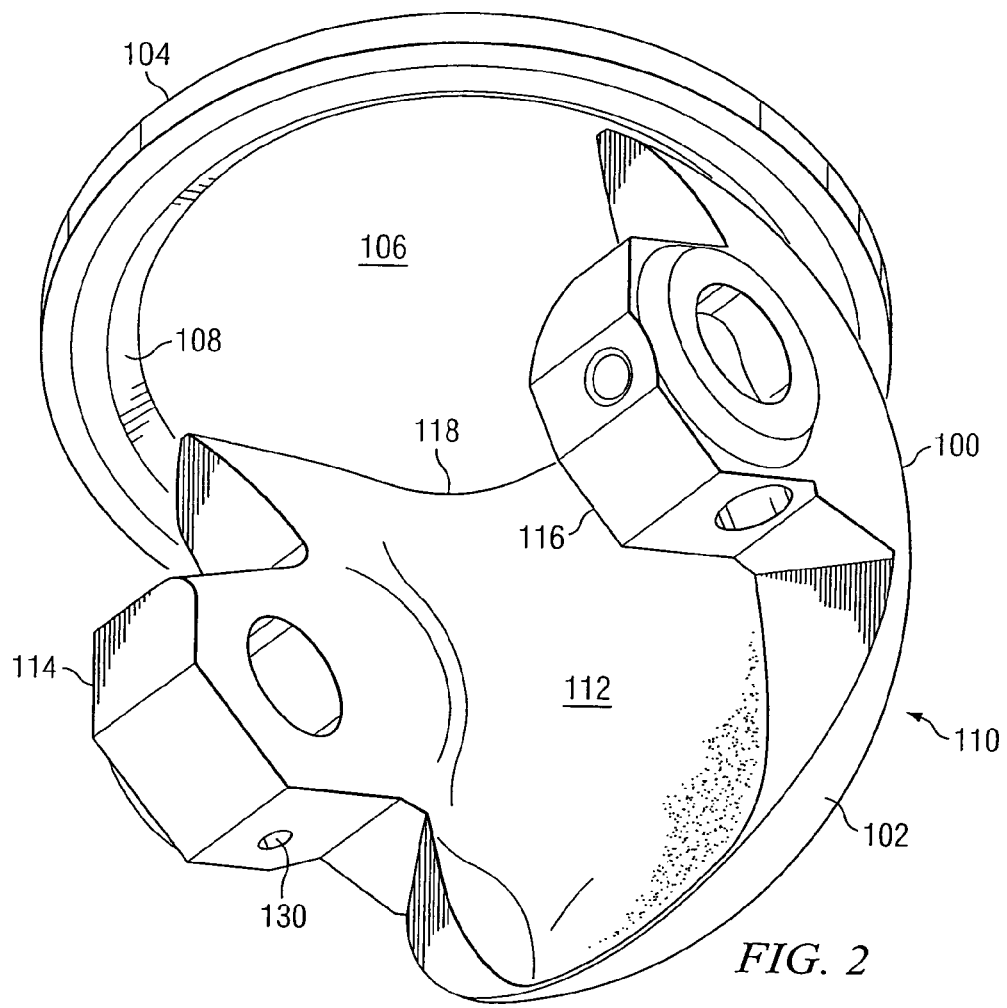
FIG. 2 is another isometric view of the example fluid valve control member of FIG. 1.

Now turning in detail to FIGS. 1 and 2, isometric views of an example fluid valve control member 100 that has a contoured sealing surface 102 and which may be used within a ball-type fluid control valve are shown. For clarity, only the relationship between the fluid valve control member 100 and a sealing ring 104 is shown in FIG. 1 and the other structures typically associated with a fluid control valve (e.g., a ball-type valve) are not shown. As depicted in FIG. 1, the fluid valve control member 100 is in an open condition, which would allow fluid to flow freely through the flow passage 106 defined by an inner diameter 108 of the sealing ring 104.

In general, the valve control member 100 is configured for use with a rotary, ball-type fluid control valve and, thus, the valve control member 100 may be rotated over about a ninety degree range between a fully open condition and a fully closed condition. The valve control member 100 includes a body portion 110 having an outer sealing surface 102 that is generally convex and spherically-shaped, an inner surface 112 that is generally recessed and concave, and a pair of opposing ears or legs 114 and 116 that extend away from the inner surface 112. As depicted in FIG. 1 a leading edge 118 of the valve control member 100 has a v-shaped profile to provide desirable fluid flow characteristics and performance characteristics of the sealing ring 104 during closing of the valve control member 100. Such v-shaped profiles for use with valve control members are known in the art and, thus, are not described further herein.

The inner surface 112 of the valve control member 100 is configured to facilitate the flow of fluid through a fluid control valve, particularly when the valve control member 100 is rotated towards the open position as shown in FIG. 1. The outer sealing surface 102 includes a first portion 120 that has a first spherical radius and a second portion 122 that has a second spherical radius. The second spherical radius is sized to be smaller than the first spherical radius to provide a substantially smooth or seamless transition between the first and second portions 120 and 122 of the sealing surface 102. The first portion 120 is configured to seal against the sealing ring 104 and the second portion 122 is configured to gradually defect the sealing ring 104 when the control member 100 is moved toward a closed condition. The first and second portions 120 and 122 are also configured to meet along a line 124 that is spaced from a seating line or portion 124 associated with the sealing surface 102. Thus, the first and second portions 120 and 122 are configured to meet so that a portion of the sealing surface 102 defining a border between the first and second portions 120 and 122 does not contact the sealing ring 104 when the fluid valve control member 100 is in a closed condition. In addition, as noted above, the first and second portions 120 and 122 of the sealing surface 102 are configured to meet via a substantially smooth or seamless transition that has substantially no ridge to be eliminated via a secondary smoothing or blending operation (e.g., via grinding), as is the case with known fluid valve control members having variable radius sealing surfaces.

The ears or legs 114 and 116 include respective bores 124 and 126 configured to receive shafts 502 and 504 (FIG. 5) in a conventional manner. The ears or legs 114 and 116 also include apertures or bores 130 and 132 configured to receive pins or any other suitable fastener to fix the shafts 502 and 504 relative to the valve control member 100.

Figure 3:
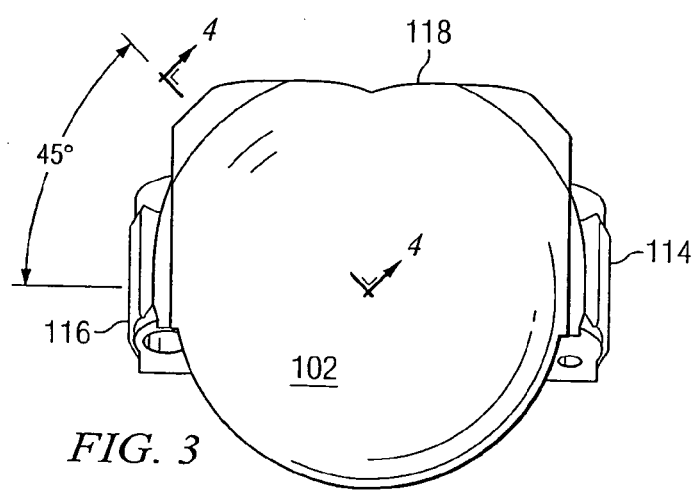
FIG. 3 is a plan view of the example fluid valve control member of FIGS. 1 and 2.
Figure 4:
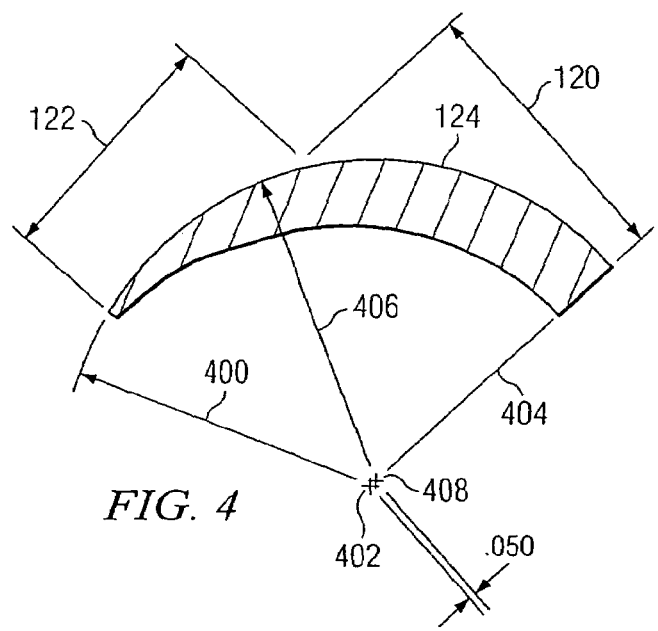
FIG. 4 is a cross-sectional view of a portion of the example fluid valve control member of FIGS. 1, 2 and 3.

FIG. 3 is a plan view of the example fluid valve control member 100 of FIGS. 1 and 2 and FIG. 4 is a cross-sectional view of a portion of the example fluid valve control member 100 of FIGS. 1, 2 and 3. As can be seen in FIG. 4, the first portion 120 of the sealing surface 102 has a first spherical radius 400 with respect to a first point 402 along a centerline 404 of the body portion 110 and the second portion 122 of the sealing surface 102 has a second spherical radius 406 with respect to a second point 408 along the centerline 404 of the body portion 110. The first and second points 402 and 408 are offset from each other and the second spherical radius 406 is sized to be smaller than the first spherical radius 400 to provide a substantially smooth or seamless transition between the first and second portions 120 and 122 of the sealing surface 102. The first and second portions 120 and 122 are configured to meet spaced from the seating line 124 associated with the sealing surface 102.

The offset between the first and second points 402 and 408 and a radial difference between the first and second spherical radii 400 and 406 are proportioned relative to each other. For example, in the case of a four inch ball-type valve, the spherical radius 400 of the first portion 120 of the sealing surface 102 may be about 2.528 inches, the spherical radius 406 of the second portion 122 of the sealing surface 102 may be about 2.505 inches, and the offset between the first and second points 402 and 408 may be about 0.050 inches. In another example, for a six inch valve, the first and second spherical radii 400 and 406 may be about 3.435 inches and 3.411 inches, respectively, and the offset between the first and second points 402 and 408 may be about 0.050 inches. More generally, the magnitude of the offset between the first and second points may be about two times the magnitude of the difference between the first and second spherical radii 400 and 406. The substantially smooth transition has substantially no ridge or other non-seamless transition to be eliminated via a secondary smoothing or blending operation.

In contrast to known fluid valve control members having contoured sealing surfaces, the control member described herein can be machined using, for example, a CNC machine without requiring subsequent (e.g., manual grinding) operations to blend or smooth the different spherical radii of the first and second sealing surface portions 120 and 122. More specifically, the fluid valve control member described herein may be fabricated by machining the body 110 of the fluid valve control member 100 to provide the first sealing surface portion 120 having the first spherical radius 400 with respect to the centerline 404 of the body 110. Then, the body 110 of the fluid valve control member 100 may be machined to provide the second sealing surface portion 122 having a second spherical radius 406 with respect to the second point 408 along the centerline 404 of the body 110 offset from the first point 402. The magnitude of the offset between the spherical radii 400 and 406 and the magnitudes of the spherical radii 400 and 406 are configured so that the different spherical radii blend smoothly or seamlessly without further machining at the border or transition between the first and second portions 120 and 122 of the sealing surface 102.

Figure 5:
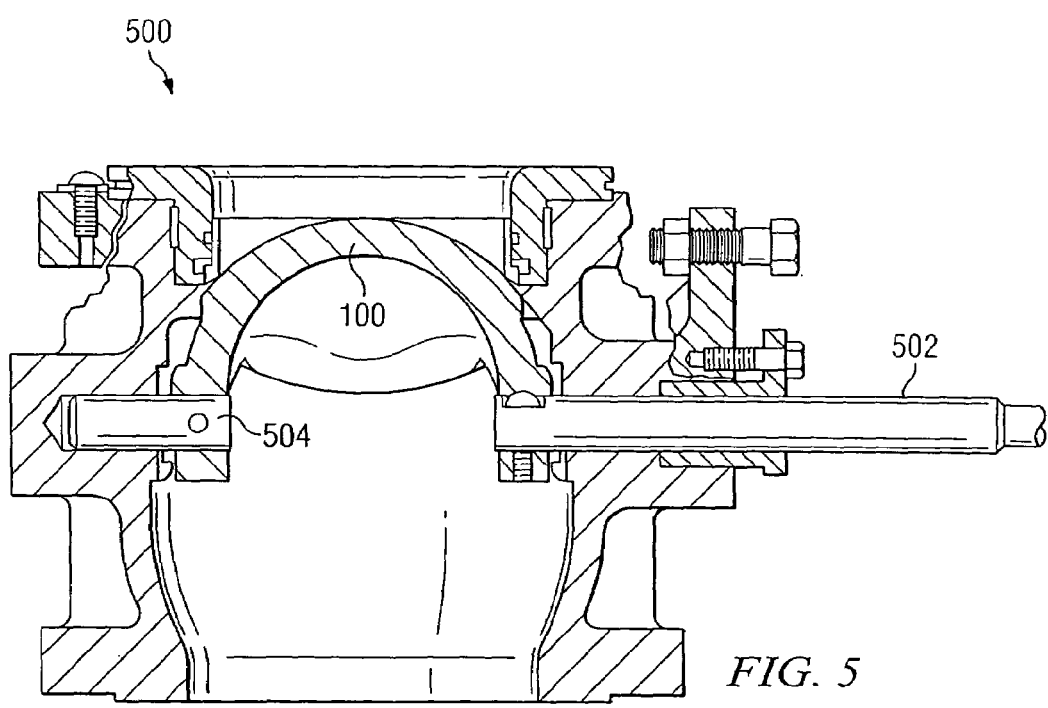
FIG. 5 is a cross-sectional view depicting one manner in which the example fluid valve control member described herein may be used within a fluid valve.

FIG. 5 is a cross-sectional view depicting one manner in which the example fluid valve control member 100 described herein may be used within a fluid valve 500. As shown in FIG. 5, the fluid valve control member 100 may be disposed within the flow path of fluid valve to form a ball-type valve.

Although the fluid valve control member described herein is depicted as being of substantially unitary construction, the fluid valve control member described herein could alternatively be made from multiple components assembled using threaded fasteners, welds, snap-fits, etc. Additionally, the fluid valve control member described herein may be made from stainless steel and/or chrome plated to provide a smooth, hard sealing surface having a high degree of corrosion and wear resistance as is commonly done.

Although certain apparatus and methods have been described herein, the scope of coverage of this patent is not limited thereto. To the contrary, this patent covers all embodiments fairly falling within the scope of the appended claims either literally or under the doctrine of equivalents.

What is claimed is:

1. A fluid valve control member, comprising:
a body portion having a sealing surface configured to engage a sealing ring within a fluid control valve, wherein a first portion of the sealing surface has a first spherical radius with respect to a first point along a centerline of the body portion and a second portion of the sealing surface has a second spherical radius with respect to a second point along the centerline of the body portion such that an offset between the first and second points cooperates with a radial difference between the second spherical radius and the first spherical radius to form a substantially seamless transition between the first and second portions of the sealing surface.

2. A fluid valve control member as defined in claim 1, wherein the distance between the first and second points is about two times the radial difference between the first spherical radius and the second spherical radius.

3. A fluid valve control member as defined in claim 1, wherein the first and second portions of the sealing surface are configured to meet at a portion of the sealing surface configured to not contact the sealing ring when the fluid valve control member is in a closed condition.

4. A fluid valve control member as defined in claim 3, wherein the portion of the sealing surface configured to not contact the sealing ring when the fluid valve control member is in the closed condition is a seating area associated with the sealing surface.

5. A fluid valve control member as defined in claim 1, wherein the body portion is configured for use in a ball-type fluid control valve.

6. A fluid valve control member as defined in claim 1, wherein the fluid valve control member is a ball-type valve component.

7. A fluid valve control member, comprising:
a body portion having a generally spherical sealing surface, wherein the generally spherical sealing surface has two regions defined by respective spherical radii, wherein a radial difference between the respective spherical radii is proportioned to an offset between the origins of the spherical radii to form a substantially seamless transition between the two regions.

8. A fluid valve control member as defined in claim 7, wherein the offset between the origins of the spherical radii is about twice the radial difference between the respective spherical radii.

9. A fluid valve control member as defined in claim 7, wherein one of the spherical radii is smaller than the other one of the spherical radii.

10. A method of making a fluid valve control member, comprising:
machining a body of the fluid valve control member to form a first sealing surface portion having a first spherical radius with respect to a first point along a centerline of the body; and
machining the body of the fluid valve control member to form a second sealing surface portion having a second spherical radius with respect to a second point along the centerline of the body, offset from the first point, wherein the first and second points are offset from each other to cooperate with a radial difference between the second spherical radius and the first spherical radius to provide a substantially seamless transition between the first and second sealing surface portions.

11. A method as defined in claim 10, wherein a distance between the first and second points is set based on a radial difference between the first spherical radius and the second spherical radius.

12. A method as defined in claim 11, wherein the distance between the first and second points is about two times the radial difference between the first spherical radius and the second spherical radius.

13. A method as defined in claim 10, wherein the first portion of the sealing surface is configured to seal against the sealing ring and the second portion of the sealing surface is configured to gradually deflect the sealing ring within the fluid control valve when the fluid valve control member is moved toward a closed condition.

14. A method as defined in claim 10, wherein the first and second portions of the sealing surface are machined to meet at a portion of the sealing surface configured to not contact the sealing ring when the fluid valve control member is in a closed condition.

15. A method as defined in claim 14, wherein the portion of the sealing surface configured to not contact the sealing ring when the fluid valve control member is in the closed condition is a seating line associated with the sealing surface.

16. A fluid control valve, comprising:
a valve body;
a sealing ring encircling a flow path through the valve body; and a valve flow control member having a body portion including a sealing surface configured to engage the sealing ring, wherein a first portion of the sealing surface has a first spherical radius with respect to a first point along a centerline of the body portion and a second portion of the sealing surface has a second spherical radius with respect to a second point along the centerline of the body portion, and wherein the first and second points are offset from each other and the second spherical radius is sized to be smaller than the first spherical radius to provide a substantially seamless transition between the first and second portions of the sealing surface such that a distance between the first and second points is set based on a radial difference between the first spherical radius and the second spherical radius.

17. A fluid control valve as defined in claim 16, wherein the distance between the first and second points is about two times the radial difference between the first spherical radius and the second spherical radius.

18. A fluid valve control member, comprising:

a body portion having a sealing surface configured to engage a sealing ring within a fluid control valve, wherein a first portion of the sealing surface has a first spherical radius with respect to a first point along a centerline of the body portion and a second portion of the sealing surface has a second spherical radius with respect to a second point along the centerline of the body portion, and wherein the first and second points are offset from each other and the second spherical radius is sized to be smaller than the first spherical radius to form a substantially seamless transition between the first and second portions of the sealing surface such that the first portion of the sealing surface is configured to seal against the sealing ring and the second portion of the sealing surface is configured to gradually deflect the sealing ring within the fluid control valve when the fluid valve control member is moved toward a closed condition.

\* \* \* \* \*